UNITED STATES PATENT OFFICE.

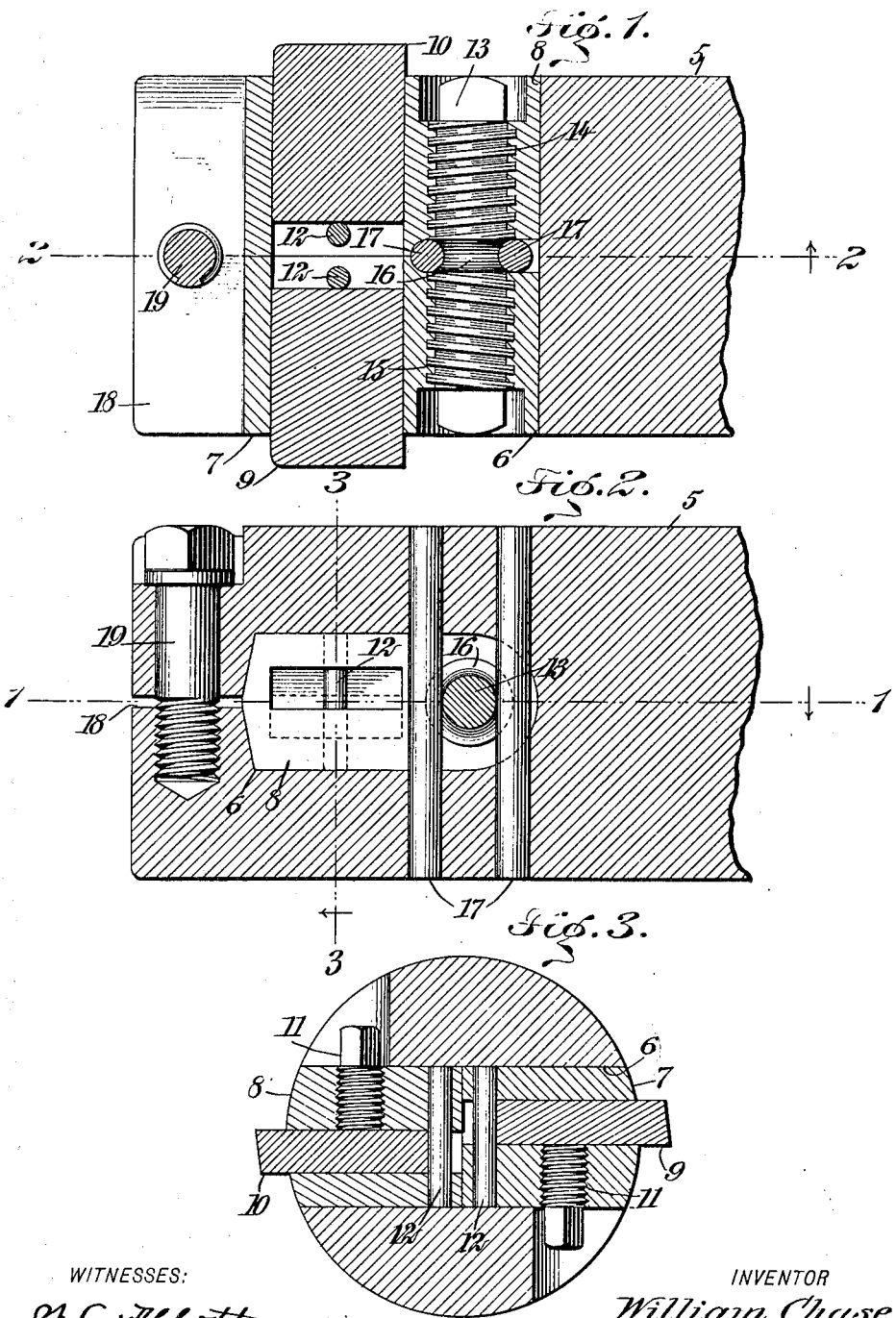

WILLIAM CHASE, JR., OF INDIANAPOLIS, INDIANA.

BORING-BAR.

No. 871,031.

Specification of Letters Patent.

Patented Nov. 12, 1907.

Application filed August 16, 1905. Serial No. 274,411.

*To all whom it may concern:*

Be it known that I, WILLIAM CHASE, Jr., a citizen of the United States, and a resident of Indianapolis, in the county of Marion and State of Indiana, have invented a new and Improved Boring-Bar, of which the following is a full, clear, and exact description.

This invention relates particularly to improvements in boring bars for car wheels, to fit the same to the axle instead of fitting the axle to the wheel, although it may be used for other purposes, the object being to provide a boring tool of novel and simple construction and having means whereby the tool holding blocks may be quickly and accurately adjusted as the work proceeds.

I will describe a boring bar embodying my invention, and then point out the novel features in the appended claims.

Reference is to be had to the accompanying drawings forming a part of this specification, in which similar characters of reference indicate corresponding parts in all the figures.

Figure 1 is a section on the line 1—1 of Fig. 2, showing the lower end of a boring bar embodying my invention; Fig. 2 is a section on the line 2—2 of Fig. 1; and Fig. 3 is a section on the line 3—3 of Fig. 2.

Referring to the drawings, 5 designates the lower end of a boring bar having a transverse opening or slot 6 for receiving the opposite tool holding blocks 7, 8, these tool holding blocks being slotted to receive cutting tools 9, 10, which are clamped in place by clamping screws 11, and the cutting tools are prevented from movement too far inward by means of pins 12, which pass through the inner ends of the blocks as clearly indicated in Fig. 3.

The adjusting screw is indicated at 13. It has a left hand thread 14 for engaging in a corresponding thread in one of the blocks, here shown as the block 8, and a right hand thread 15 for engaging in a corresponding thread of the other block. To prevent longitudinal movement of the adjusting screw it is at its center provided with an annular channel 16, and rods 17 at opposite sides of the screw engage in this channel as indicated in Fig. 1, and these rods are rigidly connected to the bar. A slit 18 extends inward from the lower end of the bar to the transverse slot in which the blocks are placed, and by means of a screw 19 passing loosely through the bar at one side of the slit and having a screw thread engagement with the bar at the opposite side of the slit, the parts may be drawn together to firmly clamp the tool holding blocks in place. The heads on the opposite end of the adjusting screw and the head on the outer end of the clamping screw are of similar shape and size so that one wrench may be used for each one. Obviously, by turning the screw 13 the tool may be adjusted outward or inward as desired. It will be noted that the blocks 7 and 8 are rounded at the top and beveled at the bottom, and that the end walls of the slot 6 are shaped thereto. By this construction the blocks are tightly clamped at the top and bottom as well as at the sides.

Having thus described my invention, I claim as new and desire to secure by Letters Patent,—

1. A boring tool, comprising a bar provided with a transverse slot and a slit leading from the bottom of the slot out through the end of the bar, the top wall of the slot being round and the bottom wall inclined inwardly and outwardly from each side to the slit, blocks in the slot of the bar and of a shape corresponding to that of the said slot and having slots to receive tools, one of the blocks being provided with a right hand threaded aperture and the other with a left hand threaded aperture, tools in the slots of the blocks, means for securing the tools in said slots, a right and left hand screw working in the apertures of the blocks, means for preventing longitudinal movement of the screw, and a screw working loosely in an opening of the bar at one side of the slit and engaging a threaded socket at the opposite side of the said slit.

2. A boring tool, comprising a bar having a transverse slot adjacent to its lower end, blocks fitting in the slot of the bar and each slotted to receive a tool and formed with a threaded opening, the thread of the opening of one block being right hand and the thread of the opening in the other block left hand, a right and left hand screw working in the openings of the blocks and provided with an annular groove between the two sets of threads, rods secured in the bar and engaging the groove of the screw at opposite sides thereof, and means for securing the blocks in the slot of the bar.

In testimony whereof I have signed my name to this specification in the presence of two subscribing witnesses.

WILLIAM CHASE, Jr.

Witnesses:
CHARLES M. DEEM,
LEWIS B. FRENCH.